(12) United States Patent
Klein et al.

(10) Patent No.: US 10,109,059 B1
(45) Date of Patent: Oct. 23, 2018

(54) METHODS AND SYSTEMS FOR BACKGROUND SUBTRACTION RE-INITIALIZATION

(71) Applicant: Google LLC, Mountain View, CA (US)

(72) Inventors: Greg Joseph Klein, Mountain View, CA (US); Charles Robert Barker, Jr., Mountain View, CA (US)

(73) Assignee: Google LLC, Mountain View, CA (US)

( * ) Notice: Subject to any disclaimer, the term of this patent is extended or adjusted under 35 U.S.C. 154(b) by 190 days.

(21) Appl. No.: 15/196,438

(22) Filed: Jun. 29, 2016

(51) Int. Cl.
*G06T 7/00* (2017.01)
*G06T 7/20* (2017.01)
*G01S 17/58* (2006.01)

(52) U.S. Cl.
CPC .......... *G06T 7/0081* (2013.01); *G01S 17/58* (2013.01); *G06T 7/0048* (2013.01); *G06T 7/2093* (2013.01); *G06T 2207/10028* (2013.01); *G06T 2207/20021* (2013.01); *G06T 2207/20144* (2013.01)

(58) Field of Classification Search
None
See application file for complete search history.

(56) References Cited

U.S. PATENT DOCUMENTS

| 7,532,113 | B2 | 5/2009 | Horvitz | |
|---|---|---|---|---|
| 7,598,865 | B2 | 10/2009 | Zhang | |
| 7,679,561 | B2 | 3/2010 | Elwell, Jr. | |
| 8,320,939 | B1 | 11/2012 | Vincent | |
| 8,386,422 | B1 | 2/2013 | Kadous | |
| 8,392,354 | B2* | 3/2013 | Salemann | G06F 17/30241 345/424 |
| 8,849,867 | B1 | 9/2014 | Pilloff | |
| 8,948,501 | B1* | 2/2015 | Kim | G01S 7/4808 345/419 |
| 9,672,446 | B1* | 6/2017 | Vallespi-Gonzalez | G06K 9/6267 |
| 2005/0143091 | A1 | 6/2005 | Shapira | |
| 2006/0061566 | A1 | 3/2006 | Verma | |
| 2008/0130952 | A1* | 6/2008 | Mittal | G06K 9/00771 382/103 |
| 2009/0102719 | A1 | 4/2009 | Lin | |
| 2010/0176952 | A1* | 7/2010 | Bajcsy | A61B 5/11 340/573.1 |
| 2010/0235129 | A1 | 9/2010 | Sharma | |

(Continued)

*Primary Examiner* — Delomia L Gilliard
(74) *Attorney, Agent, or Firm* — McDonnell Boehnen Hulbert & Berghoff LLP (57) ABSTRACT

Example methods and systems for background subtraction re-initialization are disclosed. In an example method, computing system may use a set of active sensors to determine a background representation of a space that can be divided into subspaces with each subspace depicted by a quantity of data points that depends on the active sensors. The system may determine locations of objects moving the space using the active sensors and the background representation. In some instances, the system may receive an indication of a change in the active sensors and responsively determine new quantities of data points that depict each subspace after the change. The system may further adjust the background representation of the space by subtracting data points corresponding to the determined locations of the objects moving in the space from the new quantities of data points that depict each subspace of the space after the change in the active sensors.

19 Claims, 8 Drawing Sheets

(56) References Cited

U.S. PATENT DOCUMENTS

| | | | | |
|---|---|---|---|---|
| 2014/0126818 A1* | 5/2014 | Wei | ............... | G06T 7/2006 382/171 |
| 2017/0292836 A1* | 10/2017 | Jia | ............... | G01B 21/042 |

* cited by examiner

METHODS AND SYSTEMS FOR BACKGROUND SUBTRACTION RE-INITIALIZATION

BACKGROUND

Physical spaces may be used for retail, manufacturing, assembly, distribution, and office spaces, among others. Over time, the manner in which these physical spaces are designed and operated is becoming more intelligent, more efficient, and more intuitive. As technology becomes increasingly prevalent in numerous aspects of modern life, the use of technology to enhance these physical spaces becomes apparent. Therefore, a demand for such systems has helped open up a field of innovation in sensing techniques, data processing, as well as software and user interface design.

SUMMARY

Example implementations of the present disclosure may relate to methods and systems for background subtraction re-initialization. As an example, a computing system may be configured to determine a background representation of a space using sensor data provided by a set of active sensors that provide measurements of the space. The determined background representation can be further divided and analyzed as subspaces with each subspace depicted by a quantity of data points that can depend on the set of active sensors. As such, the computing system may use the determined background representation depicting the space and subsequent measurements from the active sensors to locate objects moving in the space. In some instances, the computing system may receive an indication of a change in the set of active sensors and responsively determine new quantities of data points that depict each subspace after the change in the set of active sensors. Additionally, the computing system may further adjust the background representation to reflect how the set of active sensors measure the background of the space after the change by subtracting data points corresponding to the determined locations of the objects moving in the space from the new quantities of data points that depict each subspace of the space.

In one aspect, a method is provided. The method may include determining, at a computing system using a set of active sensors, a background representation of a space. The background representation can be divided into a plurality of subspaces, and each subspace can be depicted by a quantity of data points in the background representation that depends on the set of active sensors. The method may also include determining, at the computing system using the set of active sensors and the background representation of the space, locations of objects moving in the space, and receiving an indication of a change in the set of active sensors. Responsive to receiving the indication, the method may include determining new quantities of data points that depict each subspace of the space after the change in the set of active sensors, and adjusting, at the computing system, the background representation of the space by subtracting data points corresponding to the determined locations of the objects moving in the space from the new quantities of data points that depict each subspace of the space after the change in the set of active sensors.

In another aspect, a system is provided. The system may include one or more processors, and a non-transitory computer-readable medium, configured to store instructions, that when executed by the one or more processors, cause the system to perform functions. The functions may include determining, using a set of active sensors, a background representation of a space. In some instances, the background representation is divided into a plurality of subspaces, and each subspace is depicted by a quantity of data points in the background representation that depends on the set of active sensors. The functions may further include determining, using the set of active sensors and the background representation of the space, locations of objects moving in the space, and receiving an indication of a change in the set of active sensors. The functions may also include, responsive to receiving the indication, determining new quantities of data points that depict each subspace of the space after the change in the set of active sensors, and adjusting the background representation of the space by subtracting data points corresponding to the determined locations of the objects moving in the space from the new quantities of data points that depict each subspace of the space after the change in the set of active sensors.

In yet another aspect, a non-transitory computer-readable medium configured to store instructions, that when executed a computing system, cause the computing system to perform functions. The functions may include determining, using a set of active sensors, a background representation of a space. In some instances, the background representation is divided into a plurality of subspaces, and each subspace is depicted by a quantity of data points in the background representation that depends on the set of active sensors. The functions may further include determining, using the set of active sensors and the background representation of the space, locations of objects moving in the space, and receiving an indication of a change in the set of active sensors. The functions may also include, responsive to receiving the indication, determining new quantities of data points that depict each subspace of the space after the change in the set of active sensors, and adjusting the background representation of the space by subtracting data points corresponding to the determined locations of the objects moving in the space from the new quantities of data points that depict each subspace of the space after the change in the set of active sensors.

In a further aspect, a system comprising means for background subtraction re-initialization is provided. The system may include means for determining, using a set of active sensors, a background representation of a space. In some instances, the background representation is divided into a plurality of subspaces, and each subspace is depicted by a quantity of data points in the background representation that depends on the set of active sensors. The system may further include means for determining, using the set of active sensors and the background representation of the space, locations of objects moving in the space. The system may further include means for receiving an indication of a change in the set of active sensors and responsive to receiving the indication, means for determining new quantities of data points that depict each subspace of the space after the change in the set of active sensors. The system may include means for adjusting the background representation of the space by subtracting data points corresponding to the determined locations of the objects moving in the space from the new quantities of data points that depict each subspace of the space after the change in the set of active sensors.

These as well as other aspects, advantages, and alternatives will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative implementations described in the detailed description, figures, and claims are not meant to be limiting. Other implementations may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Additionally, in this disclosure, unless otherwise specified and/or unless the particular context clearly dictates otherwise, the terms "a" or "an" means at least one, and the term "the" means the at least one.

Example implementations of the present disclosure relate to methods and systems for background subtraction re-initialization. A computing system configured to measure aspects of a space may determine a background representation of the space using sensor data provided by a set of active sensors (e.g., LIDAR sensors) in the space. Particularly, sensor data captured by the active sensors may indicate the positions of objects, walls, floors, windows, and other structural features in the space. As such, the computing system may be configured to use measurements within incoming sensor data to determine a background representation of the space that depicts the general layout and fixed structures that making up the background of the space.

The determined background representation can be divided into a number of subspaces that can allow the computing system to focus upon particular areas of the space. Each subspace may be depicted by a quantity of data points in the background representation that can depend on various parameters, such as operation of the active sensors and location of the subspace within the space, for example. For example, sensor measurements for subspaces of the space that depict areas positioned off the ground without any structural features (e.g., no wall) located therein are likely not going to include any data points unless there is an object occupying the given subspace at the time of measurement. Conversely, sensor measurements of subspaces depicting areas of the space containing floors, walls, or other structures (e.g., stairs) can often contain an amount of data points that typically remains constant without interference from objects or other possible factors (e.g., change in sensor operation due to temperature changes). As such, a computing system may receive and use sensor measurements from active sensors to determine a background representation of the space that contains data points arranged in a manner that reflects the space's background.

As indicated above, the set of active sensors may impact the quantities of data points that depict subspaces within a determined background representation. For example, in some instances, some subspaces can include a higher number of data points in a determined background representation when the active set of sensors includes a higher number of sensors measuring data for the computing system. In other instances, a subspace may include less data points in the background representation when the active set of sensors includes one or more offline sensors and/or when an object is positioned in the foreground blocking a sensor or sensors from obtaining direct measurements of the subspace.

In some examples, when a computing system determines the background representation of a space, the computing system may use sets of measurements depicting the space over time from the active sensors in order to determine average quantities of data points for each subspace in the background representation. The computing system may associate the average quantities of data points gathered over time as the amounts of data points depicting the subspaces in the background representation in order to potentially reduce noise and/or other factors (e.g., objects) from causing the background representation to have inaccurate data points for one or more subspaces.

After determining the background representation of the space, the computing system can use the determined background representation and subsequent data from active sensors to detect and locate objects moving in the space. In some instances, the computing system may be configured to detect objects in the space by identifying when a subspace appears more or less data points within a set of new sensor data that is above a threshold change in quantity of data points. For example, the computing system may determine that a set of incoming sensor data appears to indicate that a group of subspaces have an increased amount of data points compared to the quantity of data points depicting those subspaces in the background representation. As such, the computing system may determine that the increased amount of data points captured in the new set of sensor data corresponds to an object that has moved into the subspaces. By detecting above threshold changes of data points corresponding to subspaces within new incoming sensor data using the background representation, the computing system may continuously and/or periodically measure changes of locations of objects in the space, including detecting and potentially identifying new objects as the objects initially enter the space.

In some instances, the computing system may receive an indication of a change in the set of the active sensors, such as a signal that the set of active sensors now includes at least one new sensor. After receiving an indication, the computing system may be configured to re-initialize the background representation to account for the change in the set of active sensors. Similarly, the computing system can also receive an indication that at least one sensor of the set of active sensors has changed from active to offline, which may indicate to the computing system that the sensor is operating erroneously or has powered off, for example. As a result, the computing system may be configured to perform a re-initialization process to ensure that the background representation accurately represents incoming sensor data from the set of active sensors after the change.

When performing a background subtraction re-initialization, the computing system may initially determine new quantities of data points that depict each subspace of the space after the change in the set of active sensors. Particularly, after the change, the active sensors may provide measurements of the space that contain new quantities of data points that do not match the quantities of data points that the computing system associated to subspaces within the background representation. As such, the computing system can use subsequent sensor data received after the change to determine the new quantities of data points depicting subspaces of the space in order to update the background representation.

Additionally, in some instances, the computing system may further adjust the background representation by subtracting data points that likely correspond to objects moving in the space from the determined new quantities of data points depicting subspaces of the space after the change in the set of active sensors. This way, the computing system may avoid associating a quantity of data points as depicting the background of a subspace when the quantity of data points correspond to an object located in the subspace that caused the sensors to receive an amount of data points that do not accurately reflect the actual background of that subspace. As such, using this process or similar processes, the computing system may continuously or periodically update a space's background representation to reflect recent measurements of the background by the active sensors.

Figure 1:
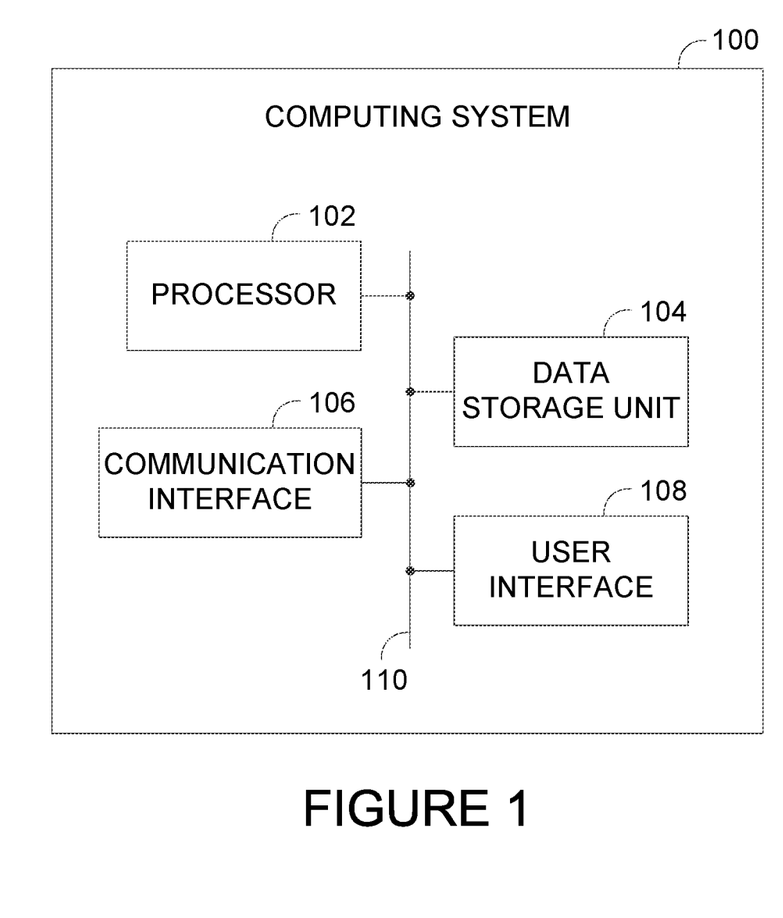
FIG. 1 is a simplified block-diagram of an example computing system.

Referring now to the Figures, FIG. 1 is a simplified block-diagram of an example computing system 100 that can perform various acts and/or functions, such as those described in this disclosure. Computing system 100 can include various components, such as processor 102, data storage unit 104, communication interface 106, and/or user interface 108. The components of computing system 100 can be connected to each other (or to another device, system, or other entity) via connection mechanism 110. In this disclosure, the term "connection mechanism" means a mechanism that facilitates communication between two or more devices, systems, or other entities. For instance, a connection mechanism can be a simple mechanism, such as a cable or system bus, or a relatively complex mechanism, such as a packet-based communication network (e.g., the Internet). In some instances, a connection mechanism can include a non-tangible medium (e.g., where the connection is wireless). Computing system 100 can include more or less components in other implementations.

Processor 102 may include a general-purpose processor (e.g., a microprocessor) and/or a special-purpose processor (e.g., a digital signal processor (DSP)). In some instances, computing system 100 may include a combination of processors.

Data storage unit 104 may include one or more volatile, non-volatile, removable, and/or non-removable storage components, such as magnetic, optical, or flash storage, and/or can be integrated in whole or in part with processor 102. As such, data storage unit 104 may take the form of a non-transitory computer-readable storage medium, having stored thereon program instructions (e.g., compiled or non-compiled program logic and/or machine code) that, when executed by processor 102, cause computing system 100 to perform one or more acts and/or functions, such as those described in this disclosure. Computing system 100 can be configured to perform one or more acts and/or functions, such as those described in this disclosure. Such program instructions can define and/or be part of a discrete software application. In some instances, computing system 100 can execute program instructions in response to receiving an input, such as from communication interface 106 and/or user interface 108. Data storage unit 104 may also store other types of data, such as those types described in this disclosure.

Communication interface 106 can allow computing system 100 to connect to and/or communicate with another other entity according to one or more protocols. In an example, communication interface 106 can be a wired interface, such as an Ethernet interface or a high-definition serial-digital-interface (HD-SDI). In another example, communication interface 106 can be a wireless interface, such as a cellular or WI-FI interface. A connection can be a direct connection or an indirect connection, the latter being a connection that passes through and/or traverses one or more entities, such as such as a router, switcher, or other network device. Likewise, a transmission can be a direct transmission or an indirect transmission.

User interface 108 can facilitate interaction between computing system 100 and a user of computing system 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing system 100 and the user of the computing device system.

Computing system 100 may be configured to analyze aspects of a space. For instance, computing system 100 may receive measurements from sensors positioned in various types of spaces, such as manufacturing facilities and distribution facilities. A sensor providing measurements to computing system 100 can be described as active. When the sensor stops providing measurement to computing system 100, the sensor may go offline, which may indicate that the sensor is no longer powered on and/or operating erroneously, for example. As such, computing system 100 can use information provided by a variety of types of sensors, such as depth sensors, cameras, or gauges.

Example sensors can include motion-capture (Mocap) sensors, or LIDAR sensors, generic force sensors, proximity sensors, motion sensors (e.g., an inertial measurement units (IMU), gyroscopes, and/or accelerometers), load sensors, position sensors, thermal imaging sensors, depth sensors (e.g., RGB-D, laser, structured-light, and/or a time-of-flight camera), point cloud sensors, ultrasonic range sensors, infrared sensors, Global Positioning System (GPS) receivers, sonar, optical sensors, biosensors, Radio Frequency identification (RFID) systems, Near Field Communication (NFC) chip, wireless sensors, compasses, smoke sensors, light sensors, radio sensors, microphones, speakers, radars, touch sensors (e.g., capacitive sensors), cameras (e.g., color cameras, grayscale cameras, and/or infrared cameras), and/or range sensors (e.g., ultrasonic and/or infrared), among others. Sensors can have a fixed-stationary position in the space or can also operate in a non-stationary manner. For example, a robotic device can measure aspects of the space using sensors that capture data as the robotic device travels. Additionally, computing system 100 may also utilize a clock for time stamping incoming sensor data and information (e.g., information from devices in the space) in order to align information from different sensors or devices that correspond to the same time.

Computing system 100 can process different types of incoming sensor data. For instance, computing system 100 may determine point cloud representations of the space using data provided from a depth sensor positioned in the space. A point cloud representation of the space may have numerous data points in a coordinate system that correspond to surfaces of objects or structures in the space. Computing system 100 may use information provided by sensors to determine various information about objects in the space, including positions of objects, sizes, and in object recognition, for example. In some instances, computing system 100 may use measurements from sensors to determine a background representation that depicts the background of a space. For example, the background representation may resemble a point cloud representation that does not include data points depicting objects moving in the foreground in the space since the objects are not part of the fixed background.

Computing system 100 may also communicate and/or control systems operating within a space, such as a lighting system or audio system. In some instances, computing system 100 can further provide instructions or requests to robotic devices or other computing devices positioned within or nearby the space.

Figure 2:
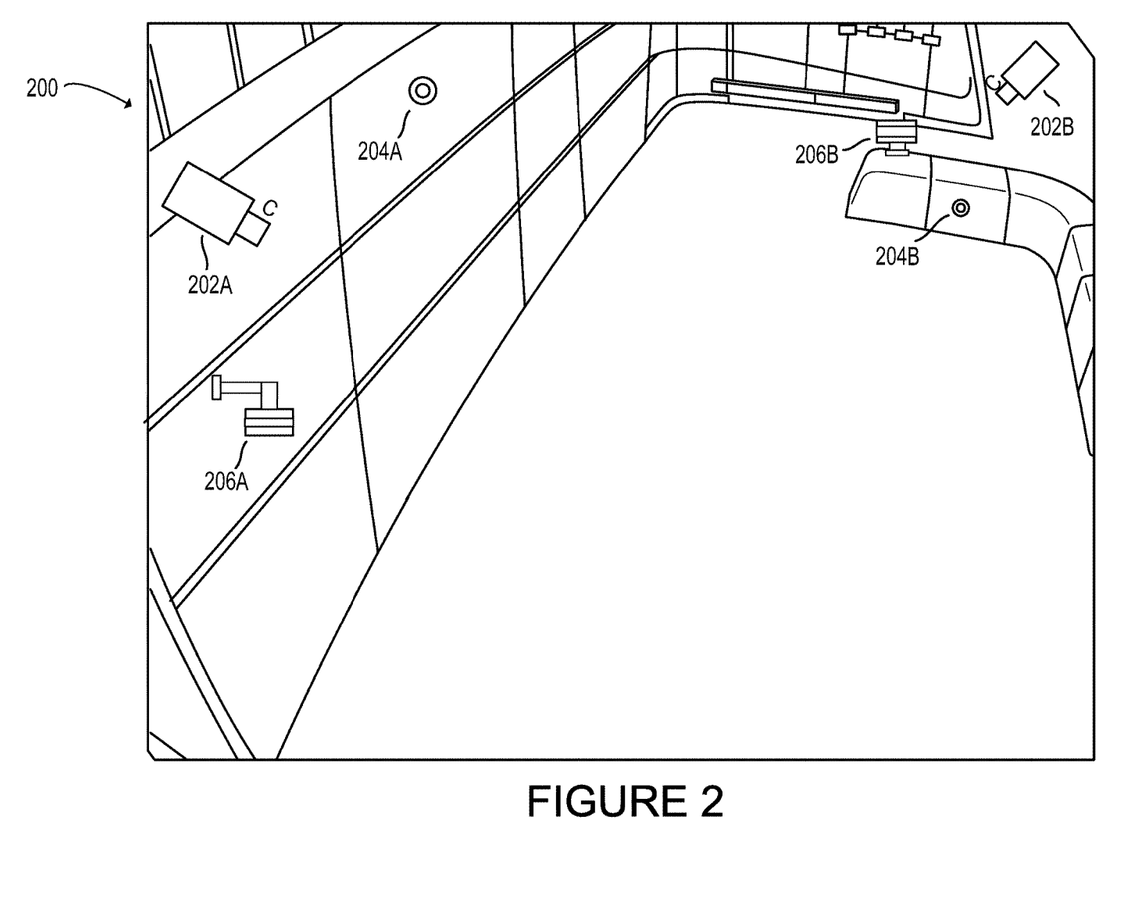
FIG. 2 depicts an example space.

FIG. 2 depicts an example space 200 that computing system 100 may use to perform methods or processes relating to background subtraction re-initialization. Space 200 is shown as a general space, but may correspond to types of indoor or outdoor environments, such as manufacturing facilities, distribution centers, or other possible locations. As shown, space 200 can include sensors, such as camera 202A, camera 202B, microphone 204A, microphone 204B, depth sensor 206A, and depth sensor 206B. In other examples, space 200 may include more or less sensors and positions of sensors may differ as well. For instance, space 200 may include a set of LIDAR sensors (e.g., ten LIDAR sensors) having fixed positions in different areas of the space.

Various sensors, such as camera 202A and depth sensor 206A, can provide information to computing system 100 in a periodic and/or continuous manner via a wired and/or wireless connection. For instance, cameras 202A-202B may provide images and/or video of space 200 and may be configured to focus upon particular areas of space 200. As such, the various sensors in space 200 can provide different types information to computing system 100 for computing system 100 to use in order to perform operations, such as object detection and background representation re-initialization.

Microphones 204A-204B can capture audio in space 200 and relay the audio information to computing system 100. As such, computing system 100 can use information provided by microphones 204A-204B for performing operations (e.g., detecting objects in space 200).

Space 200 can include depth sensors, such as depth sensors 206A-206B. The depth sensors can correspond to laser-based sensors (e.g., LIDAR), camera-based sensors (e.g., RGB cameras), or other types of depths sensors. For instance, depth sensor 206A and depth sensor 206B may correspond to LIDAR sensors having fixed positions in space 200 that can produce point clouds made up of data points (e.g., 60,000 data points) that represent the surfaces of nearby objects or structures (e.g., floors, walls) in space 200. As such, depth sensor 206A and depth sensor 206B may provide information to computing system 100 and/or may operate as a system to provide merged information (e.g., a merged point cloud) to computing system 100. In some instances, computing system 100 may receive information from depth sensor 206A and depth sensor 206B at the same time and merge the information and/or receive the information at staggered times. Computing system 100 may use various processes to merge and utilize information from sensors in space 200.

As discussed above, computing system 100 may receive information from sensors and determine representations of space 200, such as a background representation depicting the background of space 200. For example, computing system 100 may receive information from depth sensors 206A-206B to determine a background representation of space 200. In another example, computing system 100 may receive and use point cloud data from depth sensor 206A and depth sensor 206B in addition to images from cameras 202A-202B to generate representations (e.g., a background representation) of space 200.

Figure 3:
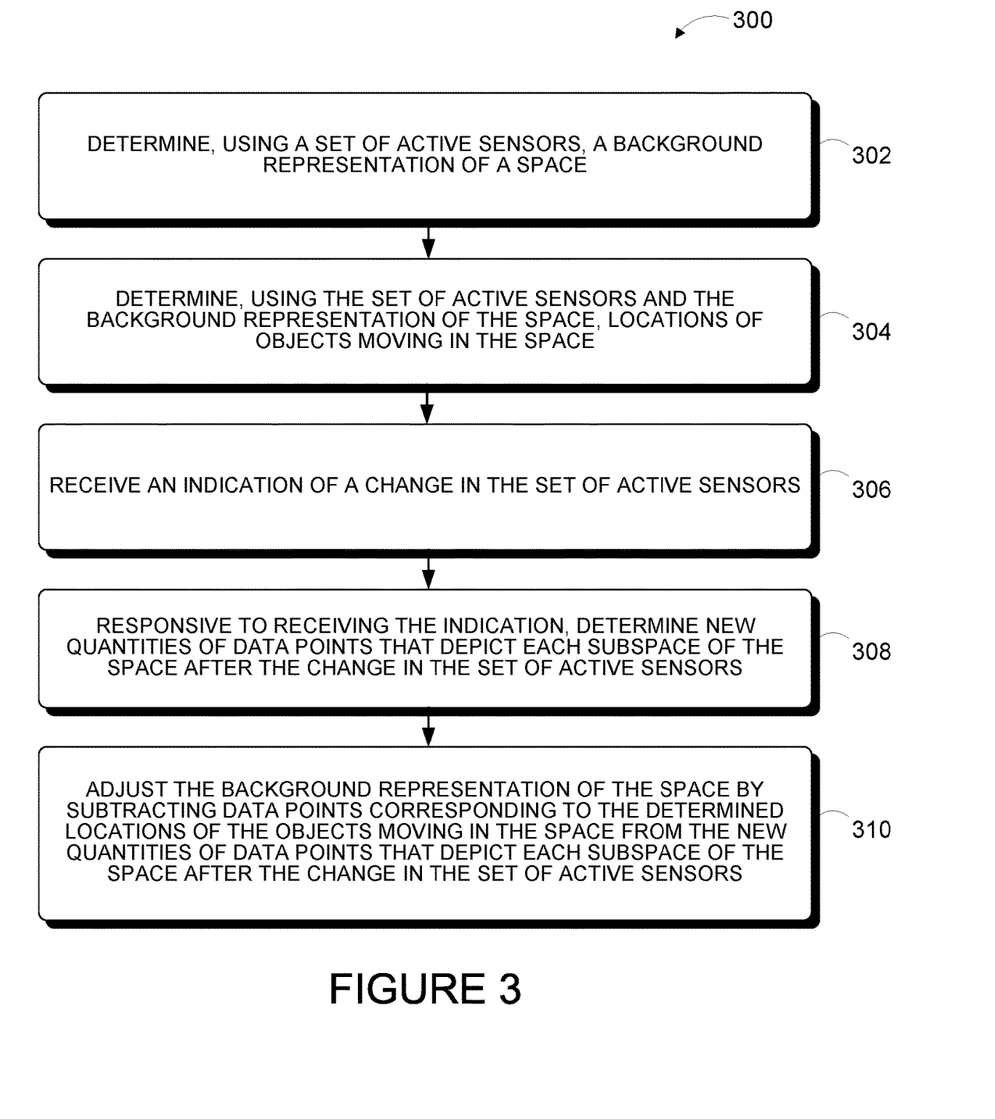
FIG. 3 is a flowchart of example method for background subtraction re-initialization.

FIG. 3 is a flowchart of example method 300 for performing background subtraction re-initialization. Method 300 represents an example method that may include one or more operations, functions, or actions, as depicted by one or more of blocks 302, 304, 306, 308, and 310, each of which may be carried out by computing system 100 described in FIG. 1, but other systems can also be used. Those skilled in the art will understand that the flowchart described herein illustrate functionality and operation of certain implementations of the present disclosure. In this regard, each block of the flowchart may represent a module, a segment, or a portion of program code, which includes one or more instructions executable by a processor (e.g., processor 102) for implementing specific logical functions or steps in the process. The program code may be stored on any type of computer readable medium, for example, such as a storage device including a disk or hard drive (e.g., data storage unit 104).

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art. In examples, a computing system may perform one or more blocks of method 300.

At block 302, method 300 may include determining, using a set of active sensors, a background representation of a space. For instance, computing system 100 may use measurements from a set of active sensors to determine a background representation depicting sensor measurements of the background of space 200. The set of active sensors can include one or more types of sensors, such as LIDAR sensors and cameras. Computing system 100 may receive sensor data in a periodic and/or continuous manner from sensors and can also use information about space 200 received from other sources (e.g., computing devices, robotic devices).

The determined background representation depicting the background of space 200 can be divided into subspaces, also described herein as voxels. Each subspace (i.e., voxel) may correspond to a particular area of space 200 and can be depicted by a quantity of data points within the background representation that may depend on various parameters, such as operation of the active sensors and location of the subspace within the space. Particularly, measurements of subspaces of the space that depict areas positioned off the ground without any structural features (e.g., no walls, no stairs) likely do not contain any data points unless an object is occupying the subspaces during the measurements. Measurements of subspaces of the space that contain structural features, such as walls, floors, or other structures may include data points that depict the structural features. These quantities of data points can typically remain constant in number and position in subsequent measurements by the active sensors unless operation of the active sensors changes or an object enters in the subspaces interfering with the measurements of the background.

Additionally, the quantity of data points for a given subspace can depend on the number of sensors measuring aspects of the subspace and/or other possible factors, such as the quality and/or accuracy of the active sensors. As such, the number of data points depicting a given subspace in the background may depend on the measurements of the subspace that active sensors are able to obtain and provide to computing system 100.

In some instances, objects moving in space 200 can also impact the number of data points that computing system 100 receives within measurements of the subspaces from the active sensors. Particularly, an object or objects may block a sensor or sensors from measuring one or more subspaces and cause computing system 100 to receive a different quantity of data points for the blocked apportion relative to nearby unblocked subspaces. For instance, physical objects, robotic devices and/or people moving in space 200 can each impact the development of a background representation of space 200 by computing system 100. As such, in some implementations, computing system 100 may determine and use an average quantity of data points when associating quantities of data points to depict subspaces in the background representation so that the background representation reflects measurements provided by the active set of sensors over a range of time rather than a particular moment. This way, the average quantities depicting subspaces can likely represent the background of space 200 more accurately than quantities of data points derived from measurements of subspaces at a particular instant in time that may have been impacted by objects moving in the foreground of space 200. Computing system 100 may use measurements over any range of time to determine quantities for depicting subspaces within the background representation.

When determining and dividing the background representation into subspaces (i.e., voxels), computing system 100 may arrange the representation into subspaces that can have various configurations, including different shapes and sizes. For instance, computing system 100 can divide the background representation into subspaces having three dimensional (3D) rectangular configurations with uniform size (e.g., cube-shaped voxels having volumes of approximately 1,000 cubic centimeters). In some instances, computing system 100 may divide the background representation into voxels that have different sizes. As an example, computing system 100 may arrange the background representation in a manner so that areas of space 200 that typically have a higher density of moving objects are depicted by a high number of smaller-sized voxels and areas of space 200 that typically have less objects moving within are depicted by a low number of larger-sized voxels.

Figure 4A:
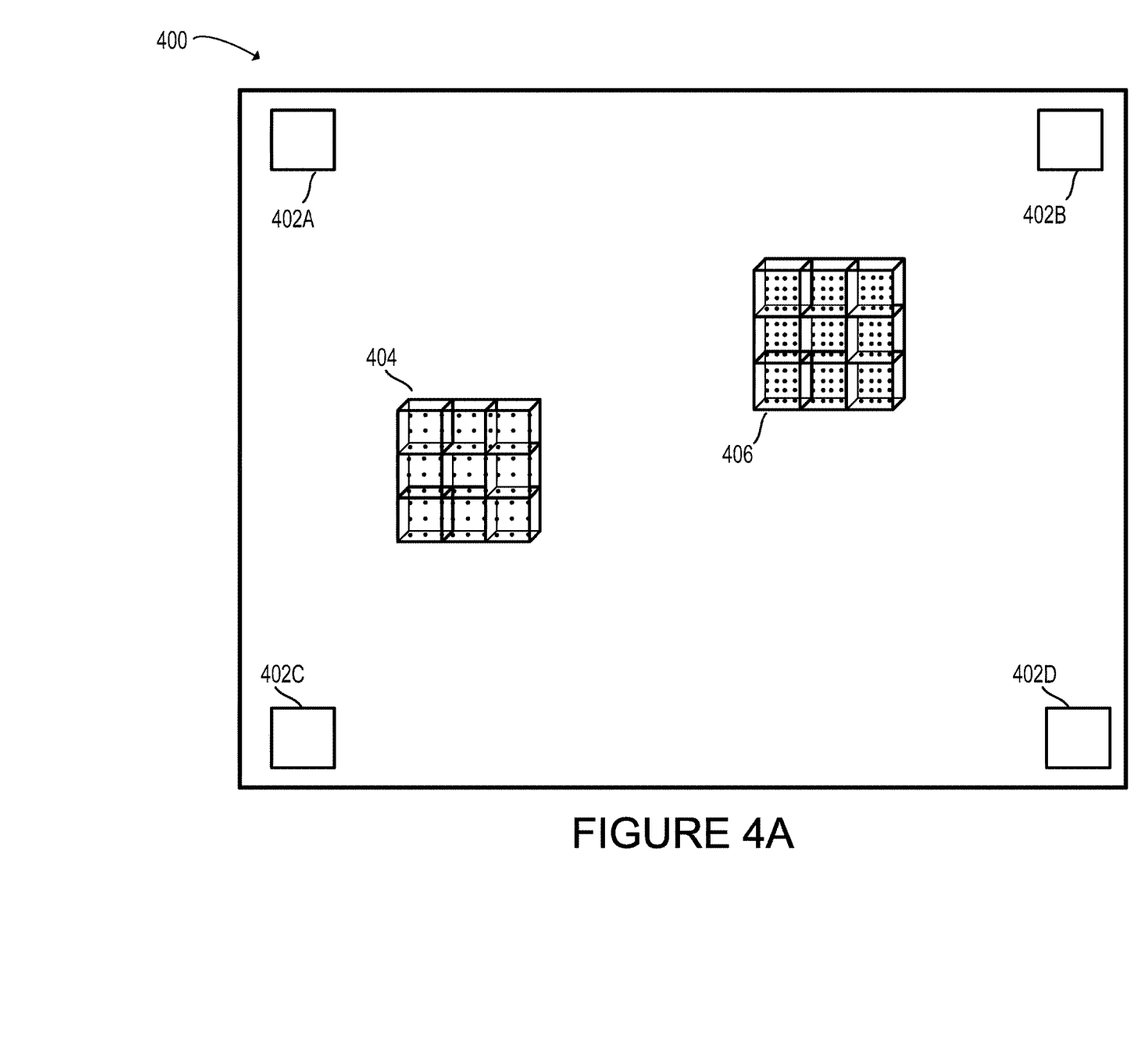
FIG. 4A depicts an example implementation of determining a background representation of a space.

FIG. 4A depicts an example implementation of computing system 100 determining background representation 400 of a space. A set of active sensors, such as sensor 402A, sensor 402B, sensor 402C, and sensor 402D, may measure aspects of a space and transmit the measurements to computing system 100 for determining background representation 400. Particularly, background representation 400 is shown from an aerial perspective and contains data points arranged in a manner that depicts the background of the space. As such, background representation 400 can assist computing system 100 perform object recognition and identification for objects moving in the space and can be divided into subspaces, including subspaces 404 and subspaces 406 shown in FIG. 4A for illustration purposes. Particularly, subspaces 404 and subspaces 406 may correspond to groups of subspaces depicting areas of the space located proximate to the floor with the subspaces including data points indicating the presence of the floor based on measurements by the sensors. In other example illustrations, background representation 400 can include more or less subspaces, such as the division of the entire space into subspaces.

As shown, both subspaces 404 and subspaces 406 include nine (9) cubic-shaped subspaces (i.e., voxels) arranged together in a rectangular configuration. As shown, the subspaces within subspaces 404 and subspaces 406 are touching. In other examples, subspaces within subspaces 404 and subspaces 406 can include space in-between (i.e., gaps). In another example implementation, subspaces 404 and subspaces 406 may each have an altered configuration, including different sizes, arrangements, and shapes. As such, subspaces 404 includes subspaces (i.e., voxels) that have less data points compared to the higher number of data points depicting subspaces of subspaces 406. As previously indicated herein, the different quantities of data points depicting the respective subspaces can depend on various parameters, including the active set of sensors and the general make-up (e.g., fixtures, materials) of the background in those areas. For instance, subspaces 404 may include less data points due to a rug positioned in the area of subspaces 404 and subspaces 406 may include more data points due to a hard floor causing the sensors to detect more data points.

Referring back to FIG. 3, at block 304, method 300 may include determining, using the set of active sensors and the background representation of the space, locations of objects moving the space. Computing system 100 can perform object detection and recognition using sensor data from the active sensors and the background representation of space 200. While measuring aspects of space 200, computing system 100 may detect that certain subspaces appear to have more data points within incoming sensor data relative to the average quantity of data points that depict those subspaces in the determined background representation. As such, these identified changes in quantities of data points may correspond to an object moving in particular areas causing the sensors to receive different measurements for those areas. In some implementations, computing system 100 may be configured to detect when incoming sensor data indicates that a quantity of data points depicting a particular subspace or subspaces exceeds a threshold change in quantity relative to the quantity or quantities depicting the subspace or subspaces in the background representation. As a result, computing system 100 may be further configured to determine that the detected change of data points in the measurements that exceed a predefined threshold quantity of data points likely corresponds to an object moving in the subspace or subspaces. The quantity associated with the applicable threshold quantity used by computing system 100 may vary within implementations and may assist computing system 100 identify when the changes corresponds to objects moving rather than changes caused by noise within incoming sensor data.

As such, computing system 100 may use algorithms to analyze incoming sensor data in order to detect objects moving in the foreground of space 200. For instance, computing system 100 may use algorithms that are configured to detect particular shapes evident by clusters of data points in sensor data that likely correspond to objects in the space. As an example, computing system 100 may use an algorithm configured to detect data points arranged in a manner that appears to correspond to certain physical structures, such as chairs or tables. In some instances, computing system 100 may perform object recognition after detecting that an object is likely located within space 200 after detecting the threshold change in data points within a set of new sensor data.

Figure 4B:
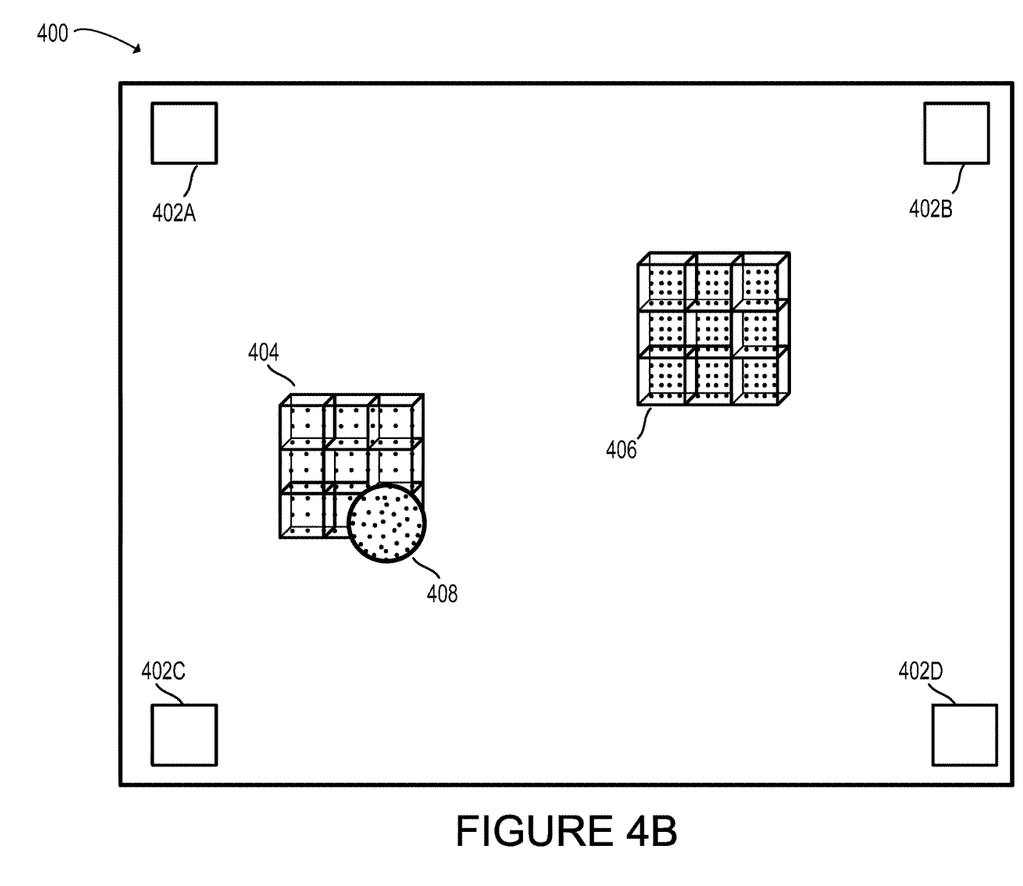
FIG. 4B depicts an example implementation of determining the location of an object using a background representation and sensor data.

FIG. 4B depicts an example implementation of determining a location of object 408 using background representation 400 and subsequent sensor data. As shown, computing system 100 can be configured to detect objects (e.g., object 408) positioned nearby subspaces 404 using background 400 and sensor data from sensors 402A-402D. Computing system 100 may detect changes in quantities of data points for corresponding subspaces of the space within incoming sensor data that may indicate the presence of object 408 nearby subspaces 404. In particular, computing system 100 may be configured to use algorithms that detect changes in data points relative to the amount of data points typically detected within the subspaces without objects in the foreground (i.e., the quantities of data points depicting the subspaces in background representation 400). For instance, computing system 100 may detect changes in quantities of data points for subspaces 404 that exceed a threshold change and responsively detect object 408 positioned in the space. Particularly, circular object 408 may cause sensors to measure different quantities of data points than the expected background data point values set forth in background representation 400. Additionally, computing system 100 may further determine that an object is likely not positioned in subspaces 406 since subspaces 406 are shown without any modification to quantities of data points as depicted within background representation 400.

At block 306, method 300 may include receiving an indication of a change in the set of active sensors. Computing system 100 may receive an indication that relates to the operations of the set of active sensors, such as an indication that the set includes a newly added active sensor. For instance, computing system 100 may initially receive sensor data from ten (10) LIDAR sensors position in space 200 and receive an indication that one or more additional LIDAR sensors are now also operating within the active set. As such, computing system 100 may receive information indicating when sensors join the set of active sensors contributing measurements of space 200 to computing system 100.

In another example, computing system 100 may receive an indication that one or more sensors within the set of active sensors have switched to an offline status, which may signal that the one or more sensors are no longer functioning properly and/or have powered off, for example. Particularly, the sensor system or computing system 100 may determine when an active sensor within the set changes to offline. Additionally, in other examples, computing system 100 can receive other indications corresponding to the set of active sensors. Computing system 100 can receive the indication(s) even when performing other processes, including during object identification and recognition processes.

Figure 4C:
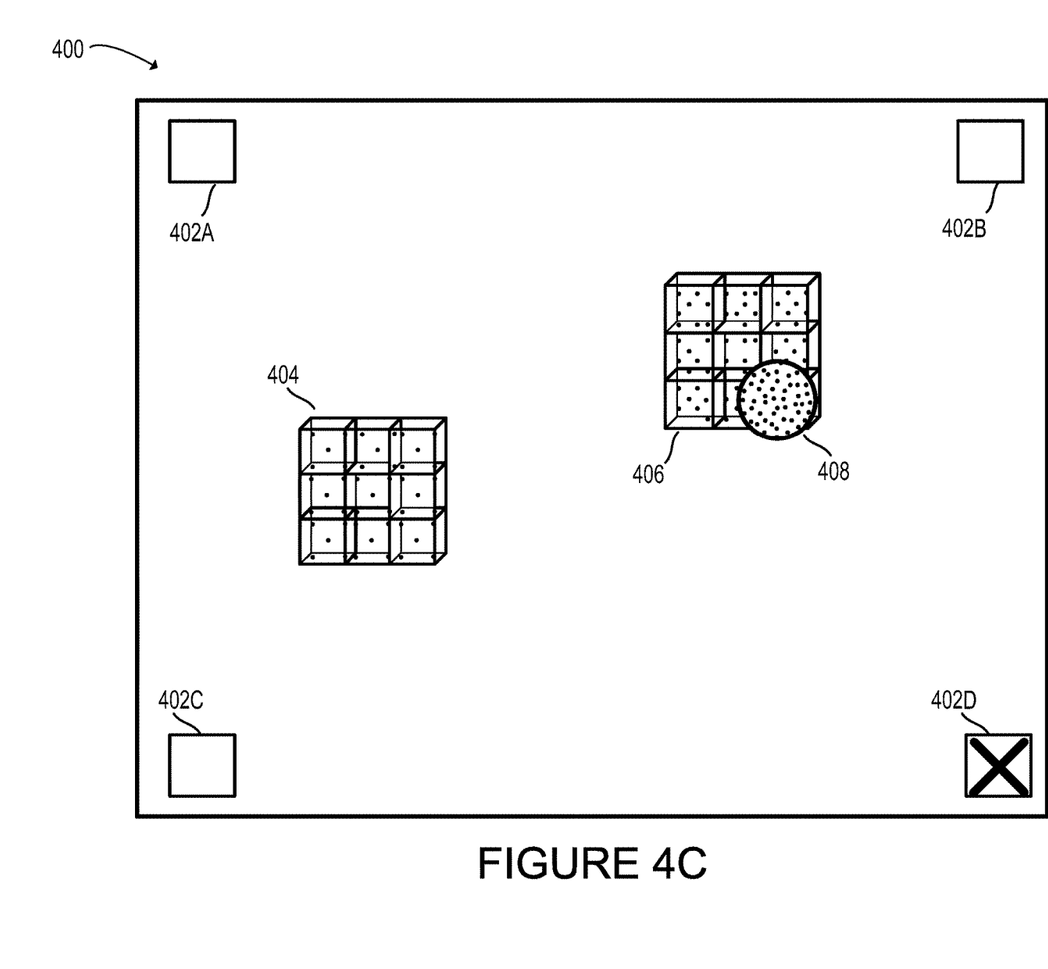
FIG. 4C depicts an example implementation of an indication of a change in the set of active sensors and determining new quantities of data points depicting subspaces for adjusting a background representation.

FIG. 4C shows computing system 100 receiving an indication of a change in the set of active sensors. Particularly, computing system 100 is shown receiving an indication that sensor 402D has switched to an offline status as represented by an "X" positioned over sensor 402D in the example illustration. As such, computing system 100 may actively respond to the indication by performing a background subtraction re-initialization process or similar processes.

Although computing system 100 is shown receiving an indication that sensor 402D has switched to offline, in other instances, computing system 100 may receive other types of indications corresponding to the sensors positioned in the space, such as an indication that a new sensor has been added to the set of active sensors.

At block 308, method 300 may include responsive to receiving the indication, determining new quantities of data points that depict each subspace of the space after the change in the set of active sensors. After receiving an indication of a change in operation of the active set of sensors, computing system 100 may be configured to adjust its determined background representation to ensure that the background representation works with the set of active sensors after the change. Particularly, computing system 100 may receive subsequent sensor data from the active set of sensors and use the sensor data to determine new quantities of data points that depict each subspace of the space after the change in the set of active sensors. Since the active set of sensors changed in some manner (e.g., added or subtracted a sensor), computing system 100 can calibrate the background representation by using new measurements to determine new quantities of data points that depict subspaces in space 200.

In an example implementation, computing system 100 may receive measurements from the active sensors that include additional data points in at least a portion of the subspaces of space 200. For instance, computing system 100 may receive additional data points as a result of the active set of sensors including another sensor contributing measurements to computing system 100. In another example implementation, computing system 100 may receive measurements with less data points in at least a portion of the subspaces of space 200 as the result of the active set of sensors including less sensors operating actively. As such, computing system 100 may be configured to utilize one or more subsequent sets of sensor data obtained from the sensors after the change in the set of active sensors in order to determine new quantities of data points depicting subspaces of space 200.

In some instances, computing system 100 may be configured to determine new quantities of data points depicting subspaces in a continuous and/or periodic manner. For instance, computing system 100 may check whether a determined background representation accurately portrays background measurements of space 200 as provided by the active sensors in a periodic manner, such as every thirty seconds. As such, computing system 100 may update its background representation for space 200 to ensure that the representation reflects recent measurements received from the set of sensors actively operating in space 200.

Referring back to FIG. 4C, computing system 100 is shown using sensor data from sensor 402A, sensor 402B, and sensor 402C without offline sensor 402D to determine new quantities of data points depicting subspaces 404 and subspaces 406. As previously discussed, the quantity of data points obtained within sensor data corresponding to subspaces may vary depending on various factors, such as the overall number of sensors providing measurements to computing system 100 and/or operation of individual sensors within the active set of sensors. Without sensor 402D contributing to measurements of the space, computing system 100 may receive sensor data that includes less data points depicting subspaces 404 and subspaces 406 as shown in the example illustration.

In other implementations, computing system 100 may determine that sensor 402D switching to an offline status only impacts the quantities of data points received for some of the subspaces of the space. For instance, computing system 100 may receive subsequent sets of sensor data from the active sensors (e.g., sensors 402A-402C) that shows that offline sensor 402D impacted quantities of data points depicting only some of the subspaces in the space, such as subspaces 406 and not subspaces in subspaces 404.

Referring back to FIG. 3, at block 310, method 300 may include adjusting the background representation of the space by subtracting data points corresponding to the determined locations of the objects moving in the space from the new quantities of data points that depict each subspace of the space after the change in the set of active sensors. As discussed above, computing system 100 may be configured to detect and measure objects moving in space 200, which may involve using sensor data from the active sensors and the determined background representation. As such, computing system 100 may be configured to identify data points within sets of sensor data that correspond to measurements of objects moving in the foreground of space 200 and subtract the identified data points from the background representation. Computing system 100 may further fill in gaps within the background representation that correspond to the subtracted data points measured from moving objects. In some instances, computing system 100 may fill in the gaps within the background representation by using nearby quantities of data points depicting subspaces located nearby the subspaces lacking data points due to the subtraction.

In an example implementation, computing system 100 may determine that an object is blocking the active sensors from obtaining measurements depicting a structural feature (e.g., stairs, a wall) of the background of a set of subspaces of space 200. As such, computing system 100 may determine a new quantity of data points that should depict that set of subspaces of space 200 in the background representation by using quantities of data points of nearby subspaces located proximate to the set of subspaces blocked by the object. In some instances, computing system 100 may determine and use average quantities of data points that depict the background of the space nearby subspaces lacking data points due to object interference. For example, computing system 100 may modify new quantities of data points that depict any subspaces of the set of subspaces based on new quantities of data points of subspaces positioned proximate to the set of subspaces after determining that an object or objects are occluding the set of subspaces.

In some instances, computing system 100 may determine that an object was located in a space that typically does not include data points depicting the background. Particularly, computing system 100 may be configured to recognize that an object blocking measurements of subspaces located above the ground without any structural features located therein (e.g., subspaces of empty space) may not have data points depicting the background. As such, computing system 100 may subtract data points corresponding to the object and associate no data points with that subspace in the background representation.

In another example implementation, computing system 100 may be configured to determine and use movement trends of objects when performing object detection and background representation modification processes. For instance, computing system may determine a trend of movement for a particular object based on prior movements of the object. Based on the determined movement trend of the object, computing system 100 may estimate subsequent positions of the object and adjust the background representation of the space by subtracting data points corresponding to the estimated subsequent position of the given object in the space from incoming quantities of data points that depict one or more subspaces of the space corresponding to the subsequent position.

Figure 4D:
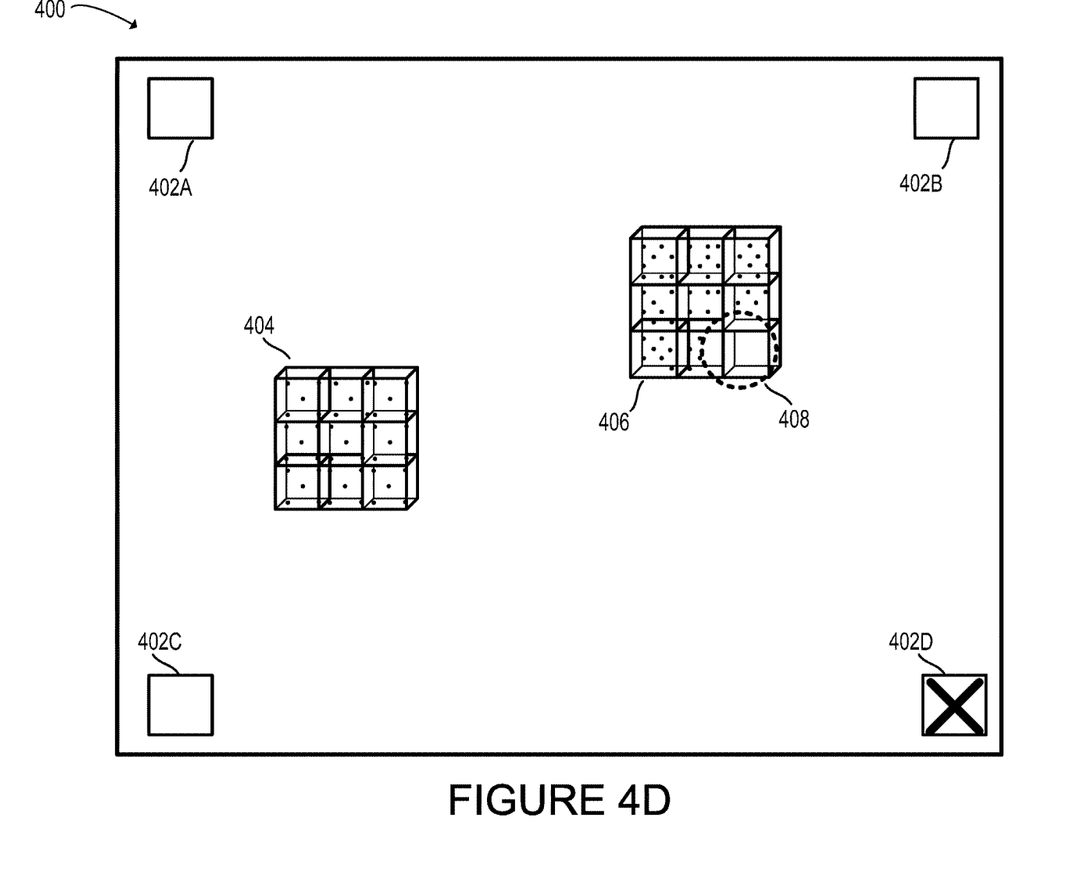
FIG. 4D depicts an example implementation of adjusting a background representation of a space based on determined locations of objects moving in the space.

FIG. 4D depicts an example implementation of adjusting background representation 400 of a space using determined locations of object 408 moving in the space. Computing system 100 may be configured to adjust background representation 400 after detecting the presence of object 408 in the area of subspaces 406. Particularly, computing system 100 may receive an amount of data points for subspaces of subspaces 406 at the location of object 408 that does not accurately represent the background of those subspaces, but rather reflects measurements of object 408 by the active sensors. As a result, computing system 100 may be configured to subtract data points at the location of object 408 to prevent associating data points corresponding to object 408 with the background of that location. After subtracting the data points that likely correspond to object 408, computing system 100 may determine new quantities for the subspaces at that location by using new sensor data and/or associating quantities of data points of nearby subspaces for the subspaces at that location. For instance, computing system 100 may use quantities of data points depicting the floor in areas of subspaces 406 not blocked by object 408 to fill in gaps caused by object 408 when adjusting the background representation.

Figure 4E:
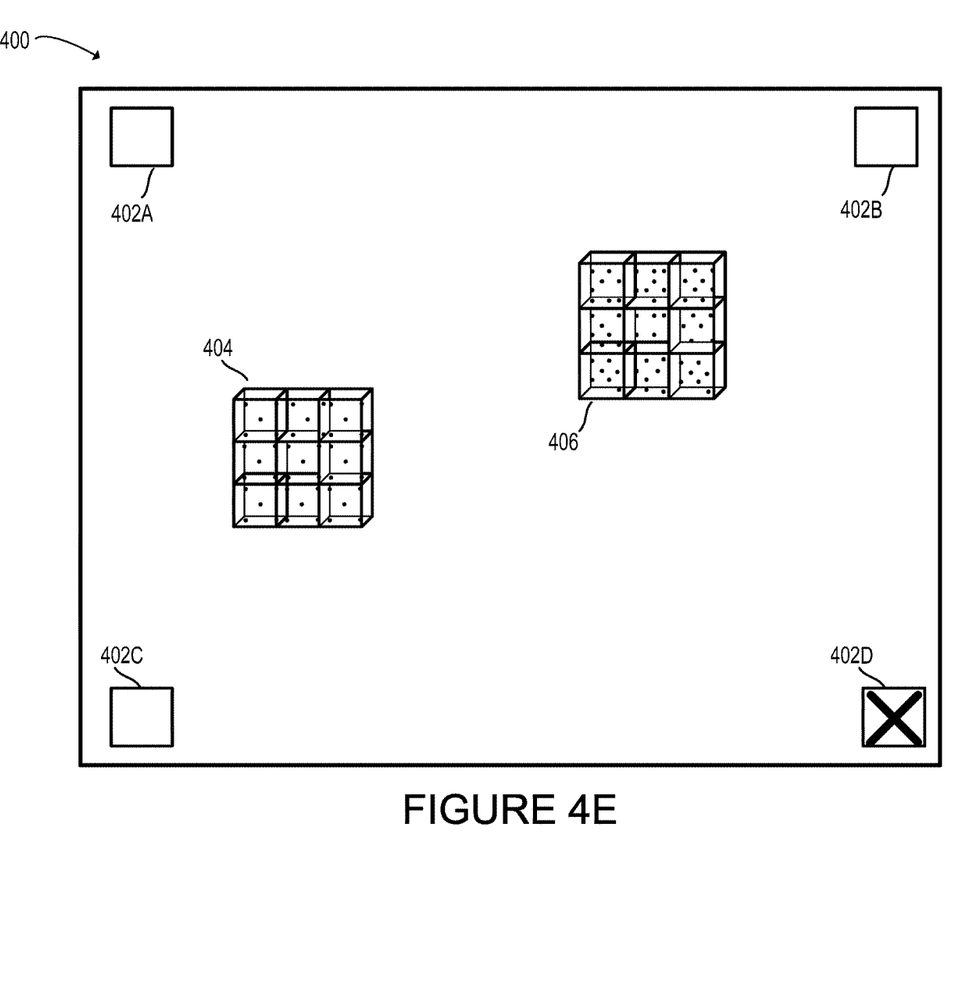
FIG. 4E depicts an example implementation of an adjusted background representation.

FIG. 4E illustrates adjusted background representation 400 as determined by computing system 100 after the change in the set of active sensors. Adjusted background representation 400 is shown with subspaces 404 and subspaces 406 being depicted by new quantities of data points after computing system 100 received the indication that sensor 402D is offline and no longer providing sensor data in the active set of sensors. As such, computing system 100 may use adjusted background representation 400 to detect movements of objects in the space and when measuring other aspects of the space. In some implementations, computing system 100 may receive another indication from the set of active sensors. For example, computing system 100 may receive an indication that sensor 402D is back online. As a result, computing system 100 may perform method 300 and/or similar processes to perform background subtraction re-initialization.

In a further example implementation, computing system 100 may using the set of active sensors and the adjusted background representation to provide an output signal indicating locations of objects moving in space 200. For instance, computing system 100 may provide instructions to a robotic device to manipulate objects in space 200 based on the determined output signal specifying the location or locations of particular objects. Additionally, computing system 100 may also be configured to control computing devices and/or other types of systems operating within space 200 based on the determined locations of objects moving in space 200. For example, computing system 100 can control audio and/or lighting systems based on detecting movements of objects in the space while using the background representation for assistance.

In some implementations, computing system 100 may be configured to receive subsequent indications (e.g., a second indication) of subsequent changes in the set of active sensors. For instance, computing system 100 may receive an indication that an offline sensor has switched back to an active status and is providing measurements of space 200 to computing system 100. As a result, after receiving a subsequent indication, computing system 100 may determine new quantities of data points that depict each subspace of space

200 and further adjust the new quantities of data points based on objects moving in the space. This way, computing system 100 may continuously update the background representation to reflect the performance of the active set of sensors.

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

We claim:

1. A method comprising:
determining, at a computing system using a set of active sensors, a background representation of a space, wherein the background representation is divided into a plurality of subspaces, and wherein each subspace is depicted by a quantity of data points in the background representation that depends on the set of active sensors;
for one or more subspaces of the space, detecting a change in a quantity of data points depicting a corresponding subspace above a threshold change in quantity of data points;
determining, at the computing system using the set of active sensors and the background representation of the space, locations of objects moving in the space based on detected changes in quantities of data points depicting corresponding subspaces above the threshold change in quantity of data points;
receiving an indication of a change in the set of active sensors;
responsive to receiving the indication, determining new quantities of data points that depict each subspace of the space after the change in the set of active sensors; and
adjusting, at the computing system, the background representation of the space by subtracting data points corresponding to the determined locations of the objects moving in the space from the new quantities of data points that depict each subspace of the space after the change in the set of active sensors.

2. The method of claim 1, wherein the set of active sensors includes a plurality of LIDAR sensors having fixed positions in the space.

3. The method of claim 1, wherein the set of active sensors includes a camera system.

4. The method of claim 1, wherein each subspace of the plurality of subspaces has a three dimensional (3D) rectangular configuration.

5. The method of claim 1, wherein the plurality of subspaces are uniform in size.

6. The method of claim 1, wherein determining, at the computing system using the set of active sensors and the background representation of the space, locations of objects moving in the space comprises:
detecting one or more prior movements of a given object;
based on the one or more prior movements of the given object, determining a trend of movement of the given object;
based on the trend of movement of the given object, estimating a subsequent position of the given object in the space; and
adjusting the background representation of the space by subtracting data points corresponding to the estimated subsequent position of the given object in the space from quantities of data points that depict one or more subspaces of the space corresponding to the subsequent position.

7. The method of claim 1, wherein receiving the indication of the change in the set of active sensors comprises:
receiving an indication that the set of active sensors includes a new active sensor.

8. The method of claim 1, wherein receiving the indication of the change in the set of active sensors comprises:
receiving an indication that at least one sensor in the set of active sensors is offline.

9. The method of claim 1, wherein responsive to receiving the indication, determining new quantities of data points that depict each subspace of the space after the change in the set of active sensors comprises:

receiving, at the computing system using the set of active sensors after the change in the set of active sensors, subsequent sensor data corresponding to the plurality of subspaces; and based on the subsequent sensor data, determining the new quantities of data points that depict each subspace of the space.

10. The method of claim 1, wherein adjusting the background representation of the space by subtracting data points corresponding to the determined locations of the objects moving in the space from the new quantities of data points that depict each subspace of the space after the change in the set of active sensors comprises:

determining that an object occludes a set of subspaces in the space; and based on determining that the object occludes the set of subspaces in the space, modifying new quantities of data points that depict subspaces of the set of subspaces based on new quantities of data points of subspaces positioned proximate to the set of subspaces.

11. The method of claim 10, wherein modifying the new quantities of data points that depict subspaces of the set of subspaces based on new quantities of data points of subspaces positioned proximate to the set of subspaces comprises:

determining an average quantity of data points based on the new quantities of data points of subspaces positioned proximate to the set of subspaces; and modifying the new quantities of data points that depict subspaces of the set of subspaces to reflect the determined average quantity of data points of subspaces positioned proximate to the set of subspaces.

12. A system comprising:

one or more processors; and a non-transitory computer-readable medium, configured to store instructions, that when executed by the one or more processors, cause the system to perform functions comprising:

determining, using a set of active sensors, a background representation of a space, wherein the background representation is divided into a plurality of subspaces, and wherein each subspace is depicted by a quantity of data points in the background representation that depends on the set of active sensors;

determining, using the set of active sensors and the background representation of the space, locations of objects moving in the space;

receiving an indication of a change in the set of active sensors;

responsive to receiving the indication, determining new quantities of data points that depict each subspace of the space after the change in the set of active sensors;

determining that an object occludes a set of subspaces in the space;

based on determining that the object occludes the set of subspaces in the space, modifying new quantities of data points that depict subspaces of the set of subspaces based on new quantities of data points of subspaces positioned proximate to the set of subspaces; and adjusting the background representation of the space by subtracting data points corresponding to the determined locations of the objects moving in the space from the new quantities of data points that depict each subspace of the space after the change in the set of active sensors.

13. The system of claim 12, wherein the quantity of data points depicting a given subspace in the background representation corresponds to an average quantity determined using the set of active sensors over time.

14. The system of claim 12, wherein each subspace of the space is a voxel having a volume of approximately 1,000 cubic centimeters.

15. The system of claim 12, further comprising:

determining, using the set of active sensors and the adjusted background representation of the space, locations of objects moving in the space; and providing an output signal indicating one or more locations of one or more objects using the determined locations of objects moving in the space.

16. The system of claim 15, further comprising:

controlling one or more computing devices based on the output signal indicating the one or more locations of the one or more objects.

17. A non-transitory computer-readable medium configured to store instructions, that when executed by a computing system, cause the computing system to perform functions comprising:

determining, using a set of active sensors, a background representation of a space, wherein the background representation is divided into a plurality of subspaces, and wherein each subspace is depicted by a quantity of data points in the background representation that depends on the set of active sensors;

for one or more subspaces of the space, detecting a change in a quantity of data points depicting a corresponding subspace above a threshold change in quantity of data points;

determining, using the set of active sensors and the background representation of the space, locations of objects moving in the space based on detected changes in quantities of data points depicting corresponding subspaces above the threshold change in quantity of data points;

receiving an indication of a change in the set of active sensors;

responsive to receiving the indication, determining new quantities of data points that depict each subspace of the space after the change in the set of active sensors; and adjusting the background representation of the space by subtracting data points corresponding to the determined locations of the objects moving in the space from the new quantities of data points that depict each subspace of the space after the change in the set of active sensors.

18. The non-transitory computer-readable medium of claim 17, further comprising:

receiving a second indication of a subsequent change in the set of active sensors;

responsive to receiving the second indication, determining new quantities of data points that depict each subspace of the space after the subsequent change in the set of active sensors; and adjusting, using the determined motion of objects in the space, the new quantities of data points that depict each subspace of the space after the subsequent change in the set of active sensors.

19. The non-transitory computer-readable medium of claim 17, further comprising:

storing the adjusted background representation of the space; and providing the adjusted background representation of the space to one or more computing devices.

\* \* \* \* \*